No. 666,733. Patented Jan. 29, 1901.
B. BUTLER.
HAND CART.
(Application filed Oct. 11, 1900.)
(No Model.)

Witnesses.
J. F. Groat.
John C. Heald.

Inventor
Bert Butler
By J. M. St. John
Atty.

ated to the handle-bars, and their lower ends
UNITED STATES PATENT OFFICE.

BERT BUTLER, OF KENSETT, IOWA.

HAND-CART.

SPECIFICATION forming part of Letters Patent No. 666,733, dated January 29, 1901.

Application filed October 11, 1900. Serial No. 32,801. (No model.)

*To all whom it may concern:*

Be it known that I, BERT BUTLER, a citizen of the United States, residing at Kensett, in the county of Worth and State of Iowa, have invented certain new and useful Improvements in Hand-Carts; and I do hereby declare the following to be a full, clear, and exact description of the invention, such as will enable others skilled in the art to which it appertains to make and use the same.

This invention relates to hand-carts for the transportation of garbage or other material, and has for its object to produce a light, strong, and durable cart for such purposes, with a platform hung low and open at one end, so as to be easily accessible.

The nature of the invention will fully appear from the description and claims following, reference being had to the accompanying drawings, in which—

Figure 1:
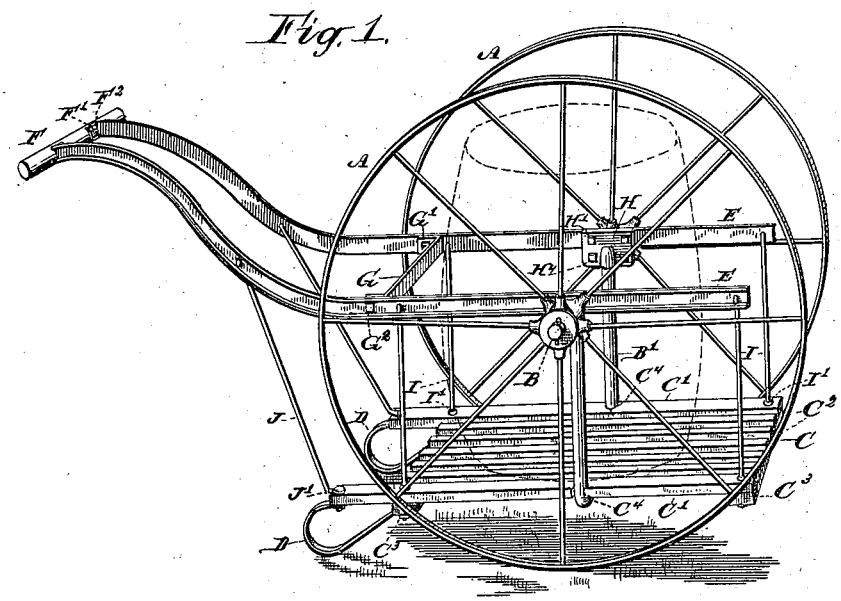
Figure 2:
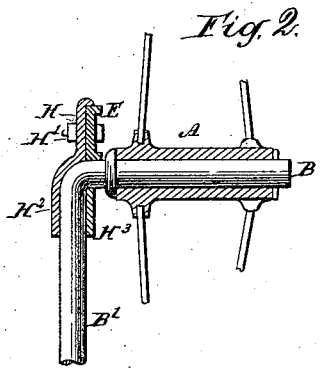

Figure 1 is a general view of a cart embodying my invention. Fig. 2 is a sectional detail showing the connection of the frame with the axle.

In the drawings, A A designate a pair of large wheels, preferably steel and of a familiar type. These are mounted on an axle B, having an inverted depending arch B'. On the cross-bar of this arch rests the middle of a platform C, comprising a series of longitudinal slats or bars C' and C² and cross-cleats C³. The side bars C' are notched or gained at C⁴ to take the adjacent vertical portion of the axle-arch, and thus hold the platform from moving endwise with respect to the axle. At the rear ends these side bars project past the platform proper and are each provided with a curved shoe D to serve as a support for the platform when at rest.

On the shoulders of the axle, near the hubs of the wheel, are mounted two handle-bars E E, which back of the platform are for convenience curved upwardly and inwardly and at the back end connect with a handle F, as by bolts F' through the handle, and lugs F², turned at the end of the handle-bars. Directly above the rear end of the platform these handle-bars are connected by a crossbar G, provided with right-angle lugs G' to take fastening-bolts G².

The handle-bars are preferably formed of light channel-iron and are each attached to the axle by a suitable clamping device H. This comprises a plate fitting the inner face of the handle-bar and bolted thereto at H', with a curved socket H² to fit the shoulder of the axle, and a clamping-plate H³, secured to the plate H by bolts H⁴.

The corners of the platform are connected with the frame above by tie-rods I, hooked or riveted to the handle-bars at the upper ends and at the lower ends passing through the cross-cleats. At the rear end of the platform they also pass through the forward ends of the shoes D and are all secured by nuts at the lower ends. These rods are provided with shoulders I' to bear on the upper face of the side bars C' against the tension of the nuts below. The frame is further stayed by diagonal braces J, similarly hooked or riveted to the handle-bars, and their lower ends secured by bolts J', passing through the rear ends of the side bars and shoes.

The cart as thus constructed combines lightness with great strength and durability and is easily handled, loaded, and unloaded.

Having thus described my invention, what I claim as new, and desire to secure by Letters Patent, is—

1. In a hand-cart substantially as described, a platform comprising the notched side bars extending back of the main platform intermediate bars parallel therewith, cross-cleats, to which all the said bars are connected, and shoes to support the rear end, combined with a depending, arched axle and connected frame, substantially as set forth.

2. In a hand-cart, the combination of a platform, a depending, arched axle to support the same, and suitable wheels mounted thereon, a pair of handle-bars and a connecting crossbar forming a three-sided inclosure of about the same area as the platform, said handle-bars curving upwardly and inwardly back of said platform, vertical tie-rods connecting the handle-bars and platform at the corners, and diagonal braces connecting the rear end with the backwardly-extending portions of said handle-bars, substantially as and for the purpose set forth.

3. In a hand-cart, the combination with the depending arched axle, of a pair of handle-bars mounted on the shoulders thereof near the wheels, a pair of wheels, and a clamp comprising the plate H having socket $H^2$, companion plate $H^3$ and bolts $H'$ and $H^4$, substantially as and for the purpose set forth.

In testimony whereof I affix my signature in presence of two witnesses.

BERT BUTLER.

Witnesses:
 JOHN BURYERAU,
 A. N. BJORGO.